Patented July 8, 1924.

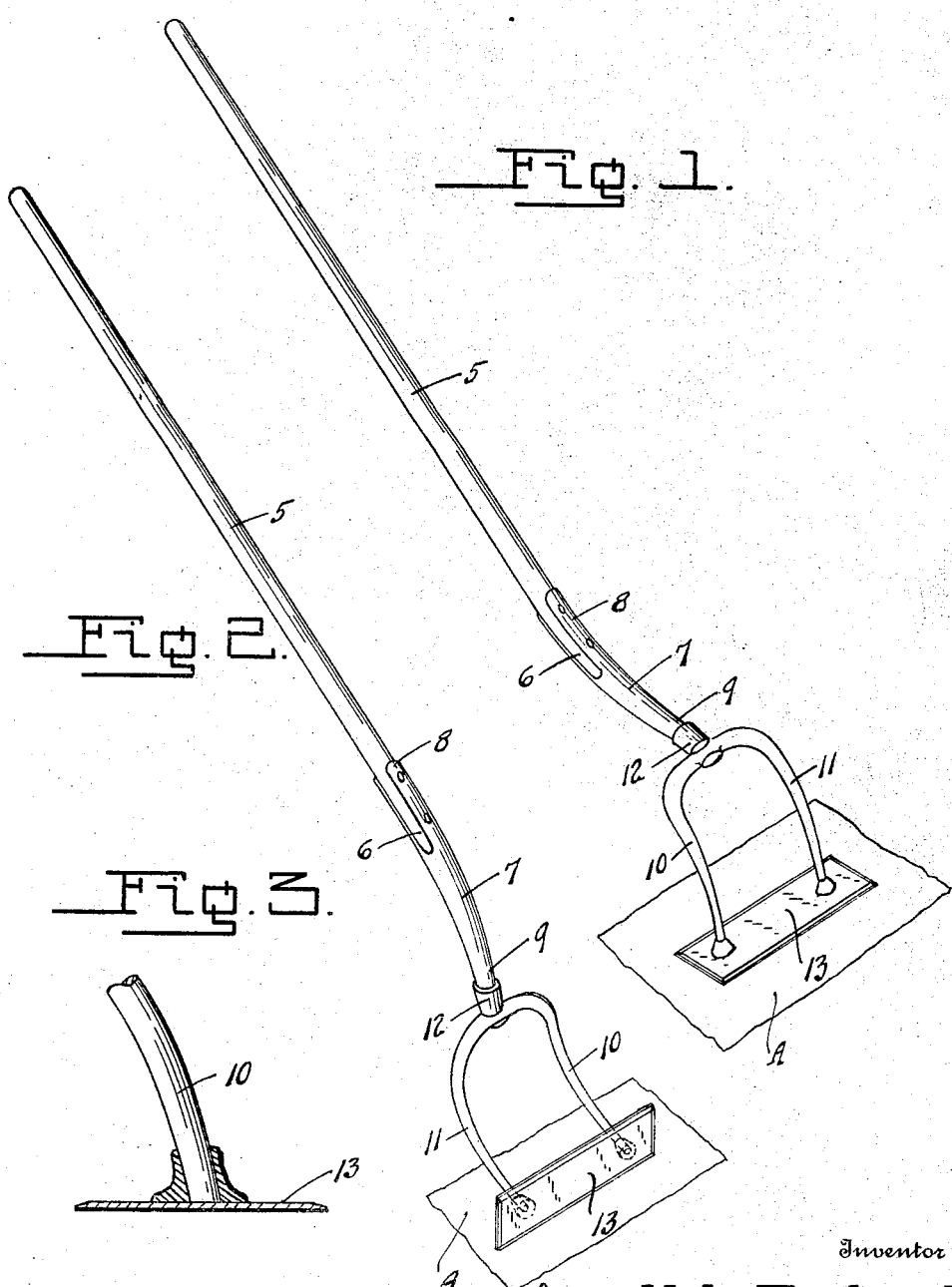

1,500,271

UNITED STATES PATENT OFFICE.

ARGYLL L. RUMBAUGH, OF DILLON, MONTANA.

WEEDER.

Application filed April 8, 1922. Serial No. 550,662.

*To all whom it may concern:*

Be it known that I, ARGYLL L. RUMBAUGH, a citizen of the United States, residing at Dillon, in the county of Beaverhead and State of Montana, have invented certain new and useful Improvements in Weeders, of which the following is a specification, reference being had to the accompanying drawings.

This invention relates to agricultural implements, and more particularly to an implement for use in weeding.

It is an object of the invention to provide an agricultural implement for use in weeding, whereby the device may be operated by a person without stooping.

Another object of the invention is to provide a weeder of this character including a cutting blade adapted to be moved in a horizontal position with respect to the ground, in any direction, to sever the weeds.

It is also an object of the invention to provide a weeder of this character, wherein the device serves as a weeder in one position, and as a hoe for cultivating when in its inverted position.

It is a still further object of the invention to provide a weeder of this character wherein a substantially rectangular blade is used, having all of its edges sharpened, the blade being secured to supporting means carried by the handle, in such a way that the end edges of the blade may be used, as well as the side edges of the blade.

With these and other objects in view, the invention consists in the improved construction and arrangement of parts to be hereinafter more particularly described, fully claimed and illustrated in the accompanying drawings, in which:—

Figure 1 is a perspective view of an agricultural implement showing the position of the implement when used as a weeder;

Figure 2 is a perspective view showing the position of the device when used as a hoe; and Figure 3 is a fragmentary sectional view showing the connection of the arms to the cutting blade.

Referring to the drawings, 5 designates a handle member which is relatively long, so as to permit the operator to use the implement without stooping. In order to further facilitate the use of this weeder, the end portion 6 of the handle is curved and provided with a socket member 7, said socket member surrounding the extremity of the end portion 6 and having its ends 8 secured to said end portion.

Disposed within the socket member 7 is a longitudinally curved shank 9 of a supporting member, while projecting from the end of the shank are supporting arms 10 and 11, the shank 9 being firmly held in the socket by means of a ferrule 12. Each of the supporting arms 10 and 11 are curved laterally with respect to the shank, substantially in divergent relation to each other and are then curved longitudinally in the opposite direction to the curvature of the end portion 6 of the handle. The extremity of each of the arms 10 and 11 is beveled inwardly. Each of the arms 10 and 11 contain a certain amount of resiliency so that there is no danger of the weeder breaking should it come in contact with a large stone. At the same time, the arms are rigid enough to permit the device to sever the weeds from the ground.

A cutting blade 13 is provided, said blade being substantially rectangular and having all four edges thereof beveled or sharpened. The blade is considerably longer than the distance between the arms 10 and 11, so that the end edges of the blade may be used for cutting as well as the side edges. The beveled ends of the arms 10 and 11 are secured to one face of the blade by any suitable means, the arms being disposed well within the ends of the blade, so as not to interfere with the cutting operation of said ends.

As shown in Figure 1, when the implement is in use, the handle is inclined in the usual manner without requiring the operator to stoop. In view of the curvature of the end portion 6 of the handle, and the longitudinal curvature of the arms 10 and 11, together with the beveled ends of the arms, the blade is held in a horizontal position with respect to the ground A. It will also be noted that the end portions of the arms are disposed substantially vertically, in view of the curvatures mentioned. The device may be moved forward, backward, or to either side to sever the weeds, the end portions permitting the device to dig beneath the weeds into the roots if necessary. If it is desired to hill up the plants, the implement may be inverted as shown in Figure 2, so that the arms 10 and 11 are disposed substantially in a horizontal position with respect to the ground A, while the blade 13 is disposed vertically with respect to the ground, thereby providing a hoe.

From the foregoing it will be readily seen that this invention provides a novel agricultural implement, which greatly facilitates weeding and like agricultural work, without causing the operator to assume an uncomfortable position. This implement also permits the user to conserve moisture in arid lands, as it only breaks the surface crust. In addition to this, it permits all four edges of the blade to be used, without interference from the supporting arms of the device, and all of these features are possessed by a device that is simple in construction.

What is claimed is:—

An agricultural implement comprising a handle having one end thereof curved, a substantially U-shaped member carried by the curved end of the handle, and including a pair of spaced arms, said arms being longitudinally curved in the opposite direction to the curvature of the end of the handle and having their extremities beveled, and a single cutting blade secured to the beveled ends of the arms, said arms being positioned at the longitudinal center line of the blade and inwardly of the ends thereof.

In testimony whereof I hereunto affix my signature.

ARGYLL L. RUMBAUGH.